March 18, 1947.  F. W. GILCHRIST ET AL  2,417,642
DEVICE FOR CLASSIFYING OBJECTS ACCORDING TO WEIGHT
Filed Sept. 28, 1943  5 Sheets-Sheet 1
*Fig. I*
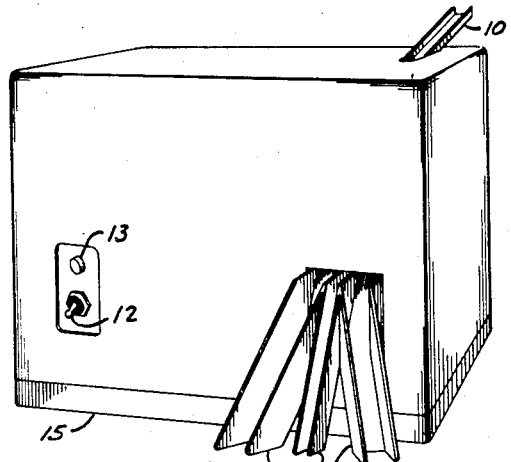
*Fig. II*
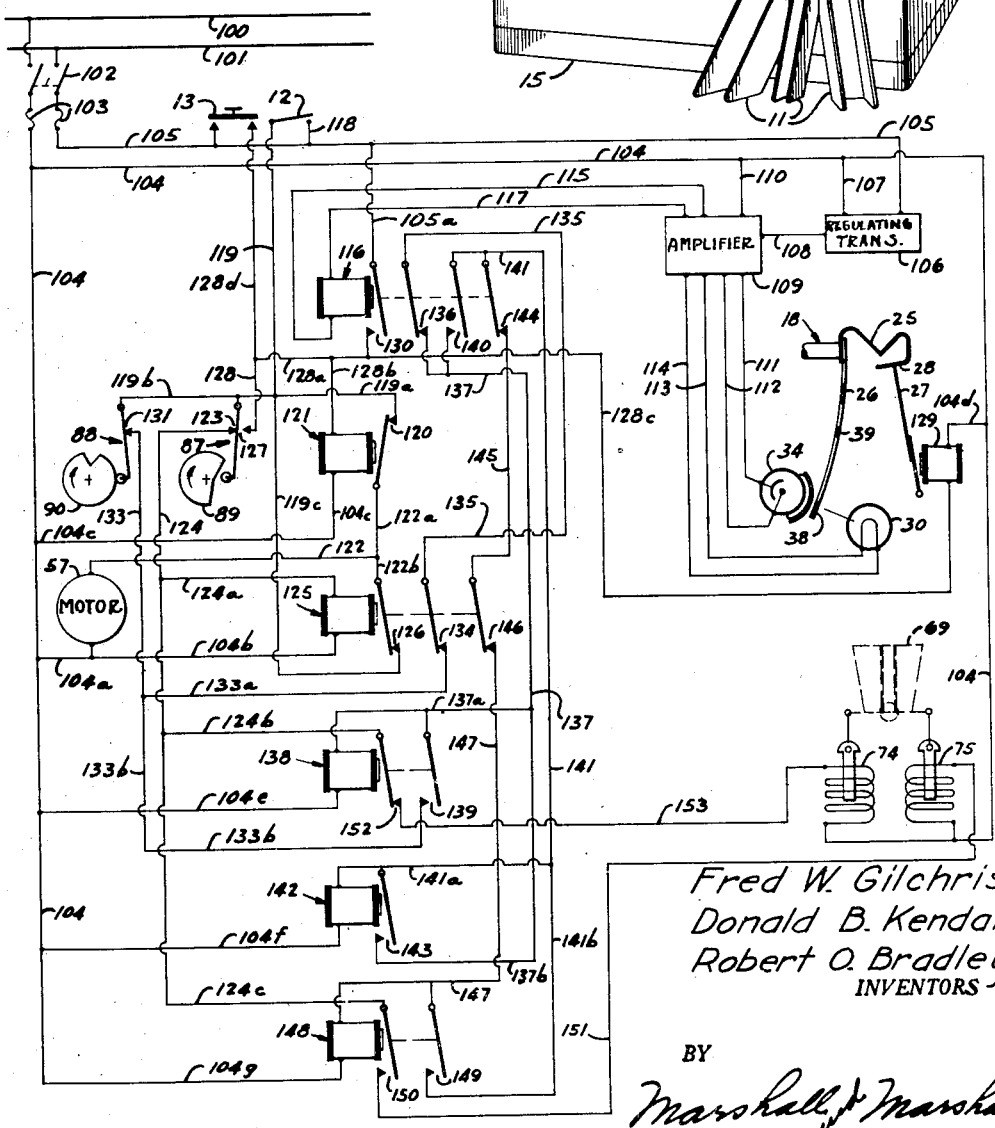
Fred W. Gilchrist
Donald B. Kendall
Robert O. Bradley
INVENTORS
BY
Marshall & Marshall
ATTORNEYS

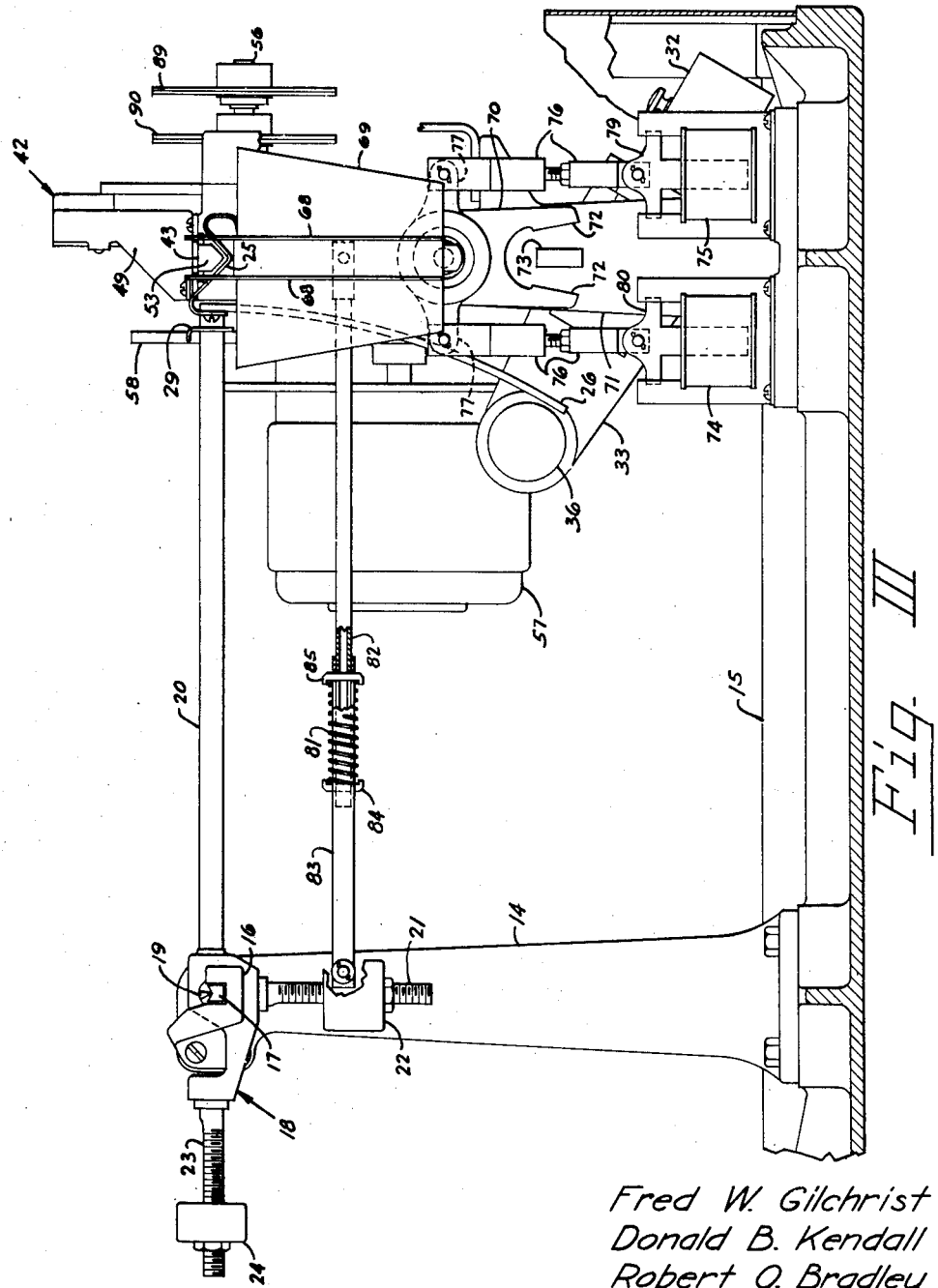

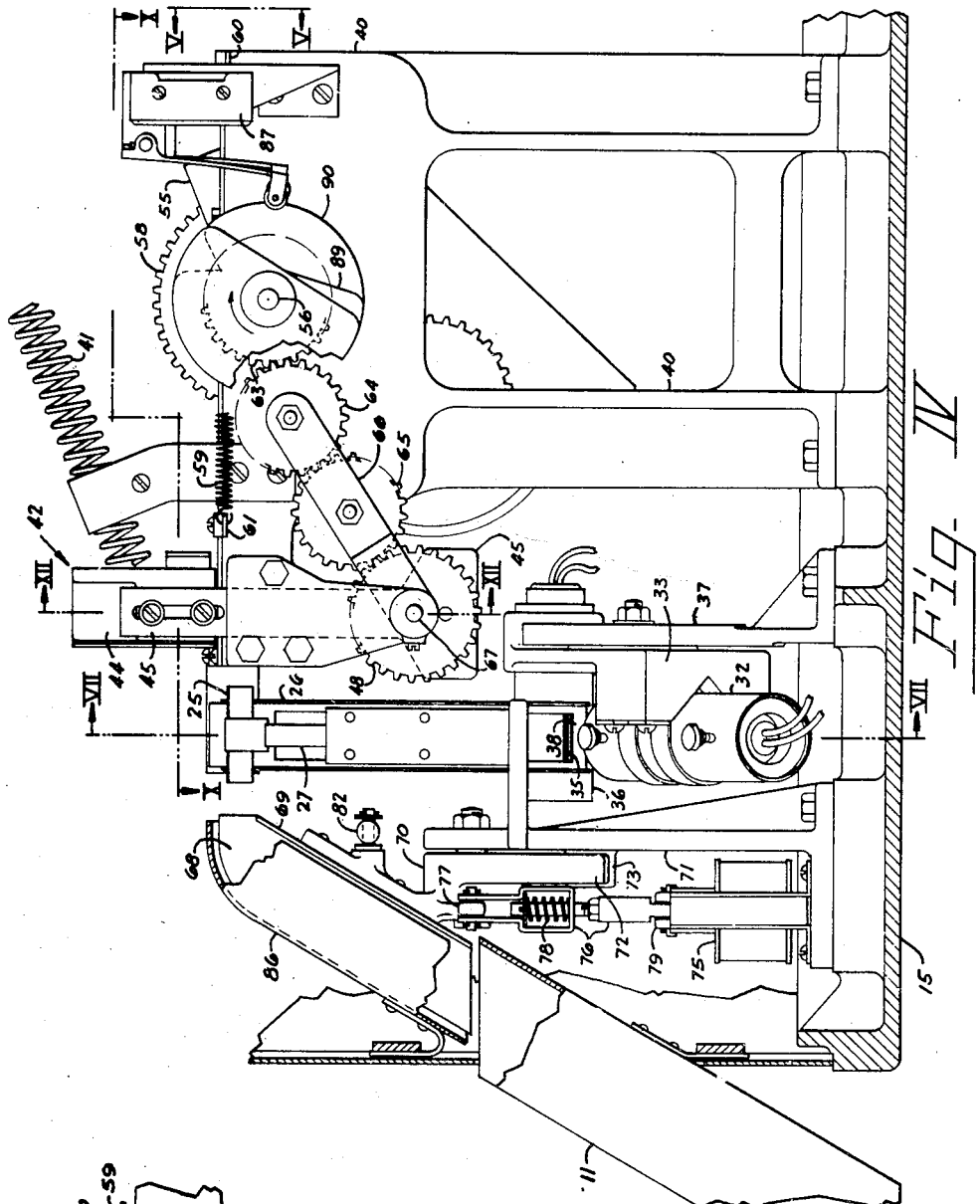

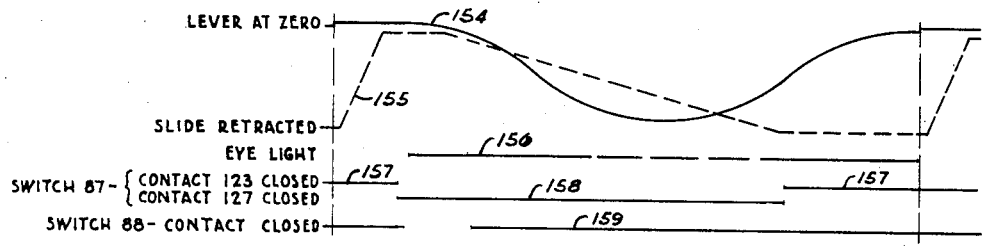
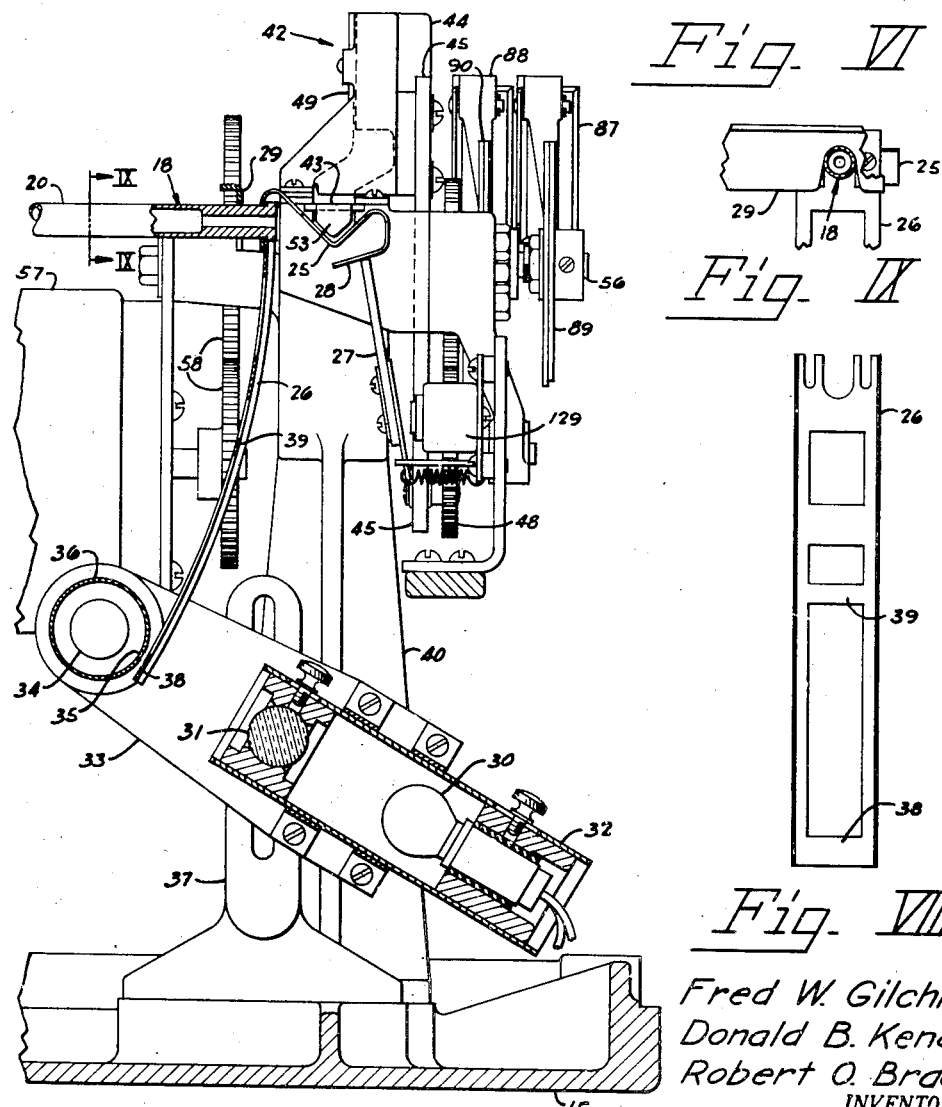
Fig. VI
Fig. IX
Fig. VIII
Fig. VII
Fred W. Gilchrist
Donald B. Kendall
Robert O. Bradley
INVENTORS

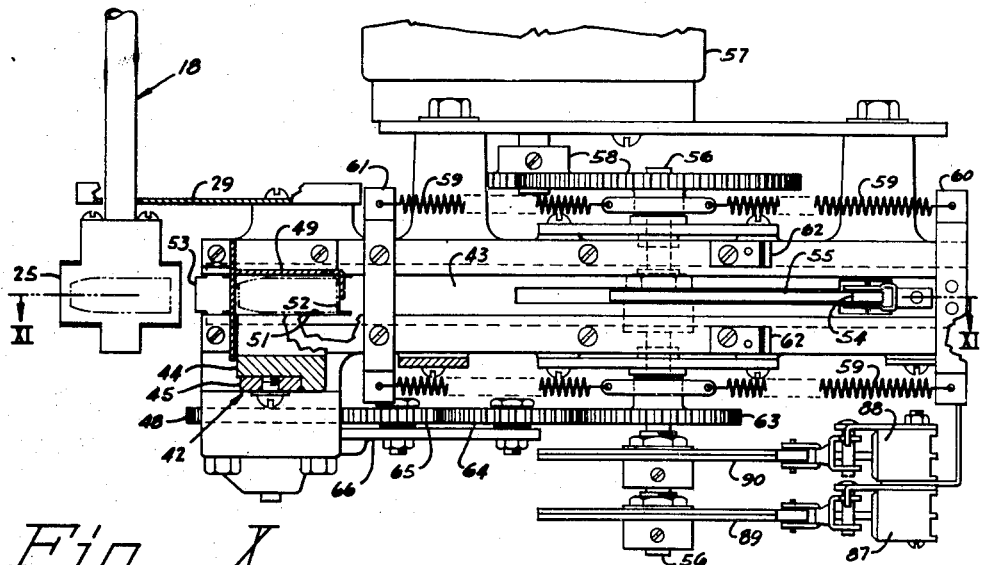
Fig. X
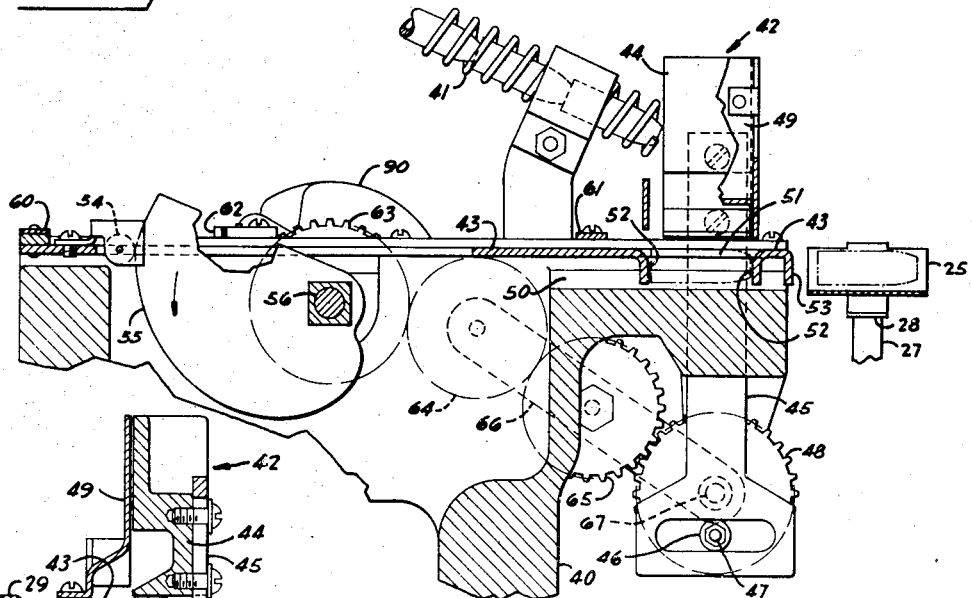
Fig. XI
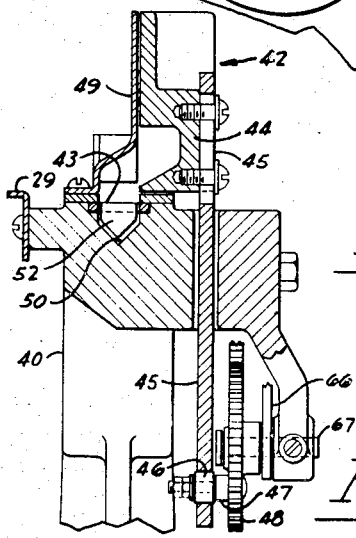
Fig. XII
Fred W. Gilchrist
Donald B. Kendall
Robert O. Bradley
INVENTORS
BY
Marshall & Marshall
ATTORNEYS Patented Mar. 18, 1947

2,417,642

UNITED STATES PATENT OFFICE 2,417,642

DEVICE FOR CLASSIFYING OBJECTS ACCORDING TO WEIGHT

Fred W. Gilchrist, Donald B. Kendall, and Robert O. Bradley, Toledo, Ohio, assignors to Toledo Scale Company, Toledo, Ohio, a corporation of New Jersey Application September 28, 1943, Serial No. 504,140

6 Claims. (Cl. 209—121)

This invention relates to weighing scales and in particular to scales for rapidly weighing objects of nearly the same weight and sorting them according to weight.

Many devices have been built incorporating scales for sorting objects by weight. In general these devices consist of means for automatically loading the object onto the scale, operating a selecting mechanism according to the indicated weight, then unloading the object into the selected chute. The speed of operation of these devices was limited by the time required for the scale to come to rest.

The object of the present invention is to provide a weighing scale for classifying objects by weight which is capable of high speed operation and high accuracy.

Another object is to provide means for loading and unloading objects onto and from the scale load receiver in a minimum length of time, without excessively disturbing the scale lever.

A still further object is to provide a scale which will weigh an object accurately without coming to rest.

These objects and others apparent to those skilled in using devices of this class are attained in the weighing and classifying scale shown in the accompanying drawings in which:

Fig. I is an exterior view of the device.

Fig. II is a schematic wiring diagram of the incorporated electrical equipment.

Fig. III is a front elevational view, parts being broken away, and parts being shown in section, of the scale with its cover removed.

Fig. IV is an end elevational view as seen from the right side of Fig. III.

Fig. V is a fragmentary view taken along the line V—V of Fig. IV.

Fig. VI is a timing diagram, illustrating the sequence of operations.

Fig. VII is an enlarged fragmentary view taken along the line VII—VII of Fig. IV.

Fig. VIII is a detailed view of the light interceptor.

Fig. IX is a fragmentary view taken along the line IX—IX of Fig. VII showing the lever stop.

Fig. X is a plan view of the loading mechanism taken along the line X—X of Fig. IV.

Fig. XI is a fragmentary elevational view of the loading mechanism taken along the line XI—XI of Fig. X.

Fig. XII is a fragmentary view of a portion of the loading mechanism taken along the line XII—XII of Fig. IV.

These specific drawings and accompanying description are intended merely to illustrate the invention and not to impose limitations on the accompanying claims.

The device completely enclosed and ready for use is shown in Fig. I. Objects to be weighed are fed down a supply chute 10, and after weighing leave via one of a number of discharge chutes 11, one chute accommodating the under weight, another the correct weight, and a third the overweight specimens. A switch 12 conditions the circuits for either continuous automatic operation or intermittent operation for testing purposes wherein each weighing cycle is initiated by pressing a push button 13.

Referring to Fig. III a pedestal 14 is erected on a substantial main base 15 and is provided at its upper end with a bearing bracket 16 having agate bearings 17 suitably embedded therein.

A lever 18, supported on the agate bearings 17 by a knife edge 19, comprises a slender tubular lever arm 20, a depending stud 21 carrying an adjustable pendulum weight 22 and a horizontally extending stud 23 fitted with a balance weight 24. The free end of the tubular lever arm 20 carries a load receiver 25 and a light interceptor 26.

The lever 18 is normally held at the upper end of its travel by a solenoid operated latch 27 (Fig. VII) engaging a cam surface 28 of the load receiver 25. The upward travel of the lever arm 20 is limited by a notched stop member 29 (Figs. VII and IX). Thus the latch 27 and the stop 29 combine to definitely locate the lever 18 at the upper limit of its travel.

Electrical indication of lever movement is provided by a photoelectric system comprising a light source and a photocell. The light source consists of a lamp bulb 30 and a cylindrical focusing lens 31 adjustably mounted in a tubular lamp housing 32 clamped to a subbase 33. A photocell 34 receiving light from the light source through a slot 35 in an enclosing light shield 36 is also mounted on the subbase 33 in spaced relation to the light source. The subbase 33 is adjustably supported on a vertical bracket 37 bolted to the main base 15.

These elements are so adjusted that the light interceptor 26 passes between the light source and light shield 36 adjacent the latter. Light rays emanating from the lamp 30 are sharply focused on the interceptor 26 by the lens 31 and in the absence of the interceptor 26 pass through the slot 35 to the photo cell 34. The light interceptor 26 is provided with spaced vanes 38 and 39 (Fig. VIII) to interrupt the light beam when the lever 18 occupies certain predetermined positions.

The automatic loading mechanism is mounted upon a standard 40 bolted to the main base 15. Objects to be weighed, shown in Fig. XI as cylindrical projectiles, are fed into the supply chute 10 either manually or automatically. From this they proceed via a helical spring chute 41, an escapement 42, and a loading slide 43 to the load receiver 25 supported on the lever 18. The escapement 42 consists of a recessed block 44 adjustably mounted on the upper end of a vertical reciprocatory member 45 whose lower end is transversely slotted to receive a roller 46 journaled on a crank pin 47 extending from the side of a gear wheel 48. When the recessed block 44 is in the upper position the recess aligns axially with the helical spring chute 41 so that objects to be weighed may successively slide from the chute 41 into the recess. A shaped guard plate 49 prevents the object from rolling out of the recess until the block 44 moves to its lower position. As the recess in the block 44 drops below the adjacent surface of the guard plate 49 the object rolls from the recess onto the loading slide 43.

The top of the standard 40 under the escapement is provided with a V-shaped trough 50 of which the load receiver 25 forms a continuation. The loading slide 43 which slides in ways recessed in the top of the standard 40 parallel to and over the trough 50 has near its forward end a slot 51 which when the slide 43 is retracted allows objects to drop from the escapement 42 to the trough 50. Lips 52 at the ends of the slot 51 transmit slide motions to the object. Another lip 53 at the tip of the slide 43 pushes the previously weighed object from the load receiver 25 as the slide 43 moves forward to position the next object thereon.

To retract the slide 43 its rear portion is slotted and provided with a roller 54 which engages a cam 55 fixedly mounted on a shaft 56 journaled on the standard 40. The shaft 56 is driven by a motor 57 acting through gears 58. The slide is pulled forward quickly when the roller 54 leaves the high spot of the cam 55 by a pair of tension springs 59 acting between a crosshead 60 mounted on the rear end of the slide 43 and a similar crosshead 61 attached to the standard 40. The forward motion of the slide is arrested by stops 62 engaging the crosshead 60 when the object between the slot lips 52 is centered on the load receiver 26.

The escapement driving gear 48 is driven from a gear 63 on the shaft 56 through idler gears 64 and 65 mounted on a strip 66 pivoted on a pin 67 which also journals the gear wheel 48. The strip 66 is yieldably held, by means not shown, in position with the idler gear 64 in mesh with the driving gear 63. If for any cause the escapement 42 should jam, the strip 66 moves upwardly disengaging the gear drive, without damaging any of the structure.

As the weighed objects are pushed from the load receiver 25 they are directed to the proper one of the discharge chutes 11 by guides 68 erected on a plate 69 which is attached to selector frame 70. The selector frame 70 is pivotally supported on a horizontal axis near the top of a post 71 erected on the main base 15. Rotary motion of the frame 70 is limited by depending fingers 72 straddling a lug 73 extending from the side of the post 71. The selector frame 70 is rocked on its axis by selective operation of a pair of solenoids 74 and 75 acting through links 76 connected to arms 77 extending horizontally from the sides of the frame 70. Preloaded springs 78 included in the links 76 allow the solenoid armatures 79 and 80 to overtravel slightly after firmly positioning the selector frame against the lug 73. With the solenoids 74 and 75 deenergized the selector frame 70 is returned to and maintained in its mid position by a compression spring 81 (Fig. III) surrounding the telescoping junction of tubes 82 and 83 pivotally attached to the selector frame 70 and the lever supporting pedestal 14 respectively. The compression spring 81 is held and acts through retaining keys 84 and 85 inserted through registering slots in the tubes 82 and 83. Since the ends of the slots register only when the selector frame 70 is in its midposition any movement of the selector frame 70 will cause telescoping motion of the tubes 82 and 83 and corresponding compression of the spring 81. Thus is attained a yieldable coupling having a definite midposition.

A suitable cover 86 overlies the selector frame 70 and guides 68 to deflect the weighed objects downward into the chute.

The electrical and mechanical operations are synchronized by a pair of switches 87 and 88 operated by suitable cams 89 and 90 mounted on the shaft 56.

In operation the motor 57 rotates the cam 55 counterclockwise from the position shown in Fig. XI allowing the loading slide 43 to rapidly move forward, thus pushing the previously weighed object off and positioning the next one on the load receiver 25. After allowing time for the object to come to rest the latch 27 is withdrawn releasing the lever 18 which immediately swings downward. As the lever 18 moves down the object is carried below the slide lips 52 and the motor 57 through the cam 55 then retracts the slide 43.

At the bottom of the swing the vane 39 may approach without intercepting the light beam from the light source to the photocell, or it may intercept it momentarily, or it may swing past it thus intercepting the beam momentarily on both the down and return stroke. The first condition occurs if the object is under weight, the second if it is of correct weight, and the last, the double interruption, if it is overweight.

When the slide retracting cam 55 has completed a revolution and returned to the position shown in Fig. XI the switch 87 actuated by the cam 89 on the shaft 56 is operated to stop the motor 57. A short time later, as the lever 18 completes its swing, the vane 38 intercepts the light, to initiate the latching of the lever 18 and the reenergization of the motor 57 to start the next cycle.

Meanwhile the selector frame 70 has been positioned according to the photocell signals received at the bottom of the lever swing to direct the weighed object to the proper one of the discharge chutes 11 when it is pushed off the load receiver 25.

The electrical controls to obtain this automatic operation are shown schematically in Fig. II. Leads 100 and 101, representing connections to a suitable power source, are connected through a twopole disconnect switch 102 and fuses 103 to leads 104 and 105 respectively. When the disconnect switch 102 is closed current flows through the lead 105 to the primary of a voltage regulating transformer 106 and then through a lead 107 to the return lead 104. The secondary of the transformer 106 supplies regulated power to a circuit comprising the lead 107, a lead 108, a photocell amplifier 109, a lead 110, and a portion of the lead 104.

The photocell 34 and light bulb 30 are connected by leads 111 and 112 and leads 113 and 114 respectively to the amplifier 109. The output current of the photocell amplifier flows through a lead 115, the coil of a relay 116, and a lead 117 to energize the relay 116 when the photocell is light. For normal automatic operation the "manual-automatic" switch 12 is closed to connect a lead 118 from the supply lead 105 to a lead 119. Current then flows from the supply lead 105 through the lead 118, the switch 12, the lead 119, a branch lead 119a, normally closed contacts 120 of a relay 121, leads 122a and 122, the motor 57 and a lead 104a to the return lead 104. Current also flows from the lead 119 through a branch lead 119b, normally closed contacts 123 of the cam operated switch 87, a lead 124, a branch lead 124a, the coil of a relay 125 and leads 104b and 104a to the return lead 104. Relay 125, thus energized, opens contacts 126 preventing current from reaching the motor 57 through a parallel circuit comprising leads 119c and 122b.

The motor, energized through the normally closed contact 120 of the relay 121, starts the cycle of operations. First, by rotating the cam 55 it releases the loading slide 43 to load the lever 18. Then, shortly after the cam 89 actuates the switch 87 opening the contacts 123 and closing the normally open contact 127. Current then flows from the energized lead 119 through the lead 119b, the now closed contact 127 of the switch 87, leads 128, 128a, and 128b, the coil of the relay 121 and a lead 104c to the return lead 104. Relay 121 now energized opens its contacts 120 thus breaking the circuit to the motor 57 through leads 119, 119a, contacts 120, leads 122a and 122. The motor 57 does not stop since the switch 87 by opening the contacts 123 broke the circuit from the energized lead 119 through the lead 119b, contacts 123, the leads 124 and 124a, the coil of the relay 125 and leads 104b and 104a to the return lead 104. The relay 125 thereby deenergized closes the contacts 126 and current flows from the energized lead 119 through the leads 119c, the contacts 126 and the leads 122b and 122 to run the motor 57.

Current also now flows from the energized lead 119 through the lead 119b, contacts 127 of the switch 87, the leads 128 and 128a, a lead 128c, the lever latch release solenoid 129, and a lead 104d to the return lead 104.

The solenoid 129 then withdraws the latch 27 and the lever 18 starts its swing. As the vane 38 of the interceptor 26 leaves the light beam, light enters the photocell 34 and the associated relay 116 is accordingly energized and closes contacts 130. Thus, whenever the photocell 34 is light current may flow from the supply lead 105 through a branch lead 105a, contacts 130 of the relay 116 to leads 128b and 128c to energize the relay 121 and the latch solenoid 129.

The motor 57, now energized through the contacts 126 of the relay 125, continues to rotate the cam 89 until the switch 87 returns to its normal position opening the contacts 127 and closing the contacts 123. Closure of the switch contacts 123 energizes the relay 125 through leads 124 and 124a, causing it to open its contacts 126, thus breaking the branch circuit through leads 119c and 122b to the motor 57. Since normally the photocell is also light at this time the relay 121 is energized so the other motor circuit through leads 119a and 122a is also open. The motor 57 therefore stops with the switch 87 in its normal position.

As the lever 18 approaches its upper position the vane 38 intercepts the light beam and thus, by deenergizing the relay 116, opens the contacts 130. Since the contacts 127 of the switch 87 are open, the opening of contacts 130 interrupts the current flow through the leads 128c and 128b to the latch solenoid 129 and the relay 121. The latch 27 thereby released engages the surface 28 of the load receiver 25 to lock the lever 18, while the relay 121 closes its contacts 120 to energize the motor 57 from the energized leads 119 through leads 119a, contacts 120 and leads 122a and 122, thus starting the next cycle.

Returning to the portion of the cycle when the lever 18 approaches the bottom of its swing and assuming the object being weighed is overweight, the vane 39 of the interceptor 26 interrupts the light beam thus deenergizing the relay 116, and current flows from the energized lead 119, through the leads 119b, contacts 131 of the switch 88, leads 133 and 133a, contacts 134 of the relay 125, a lead 135, contacts 136 of the relay 116, leads 137 and 137a, the coil of a relay 138 and a lead 104e to the return lead 104. Relay 138, thus energized, by closing its contacts 139 completes a holding circuit from the lead 133 through a lead 133b, contacts 139, and the lead 137a to energize the relay 138 independently of the relay 116. As the lever 18 continues its downward swing the relay 116 is energized as light again enters the photocell 34 and current then flows from the now closed and energized contacts 139 through the leads 137a and 137, contacts 140 of the relay 116, leads 141 and 141a, the coil of a relay 142 and a lead 104f to the return lead 104. The relay 142, by closing its contacts 143 establishes a holding circuit from the previously energized relay 138 through the leads 137a, 137b and the contacts 143. The relays 138 and 142 are now held in by current flowing through the switch 88 and their own holding contacts 139 and 143.

On the upward swing of the lever 18 the vane 39 again interrupts the light to deenergize the relay 116. This time, since relays 138 and 142 are still held in, current flows from the lead 141a through the lead 141, the now closed contacts 144 of the relay 116, a lead 145, contacts 146 of the relay 125, a lead 147, the coil of a relay 148 and a lead 104g to the return lead 104. The relay 148 closes its contacts 149 to establish a holding circuit from the lead 141, energized from the relay 142, through lead 141b and contacts 149 to the lead 147 to hold relay 148 energized independently of the light controlled relay 116.

The next energization of the relay 116 as the vane 39 leaves the light beam has no effect upon the circuits other than to hold the relay 121 and latch solenoid 129 energized as the cam 89 returns the switch 87 to its normal position with contacts 127 open when the lever is about half way up on its return swing. The contacts 123, closed by operation of the switch 87, allow current to flow from the energized lead 119, through leads 124 and 124c, contacts 150 of the now closed relay 148, a lead 151 and the solenoid 75 to the return lead 104. The solenoid 75 thereupon positions the selector plate 69 to direct the object into the overweight group.

If the object is under weight the lever does not swing far enough to cause the vane 39 to interrupt the light beam. Thus there are no operations of the relay 116 before the cam 89 returns the switch 87 to its normal position thereby energizing relay 125 to open its contacts 126, 134, and 146. The open contacts 134 and 146 prevent operation of any of the relays 138, 142 or 148. Therefore, when the contacts 123 of the switch 87 close current flows from the energized lead 119 through the contacts 123, leads 124 and 124b, the normally closed contacts 152 of the relay 138, a lead 153 and the solenoid 74 to the return lead 104. The solenoid 74 thereupon positions the selector 70 to direct the object into the underweight group.

If the object is of the correct weight the vane 39 will interrupt the light beam once at the bottom of its swing and in the manner described will energize the relays 138 and 142. There being no more light interruptions before the switch 87 is returned to its normal position, the cycle ends with the relays 138 and 142 energized and the relay 148 deenergized. Therefore the circuits to the solenoids 74 and 75 are open and the selector plate 69 remains in the central position to direct the object into the correct weight group.

Each selective setup of the relays 138, 142 and 148 is cleared at the start of the next cycle as the cam 90 operates the switch 88 to briefly open its contacts 131.

The synchronization of the switches 87 and 88 in relation to the lever and loading slide movements is shown in the timing diagram shown in Fig. VI.

The solid line 154 is a plot of the position of the lever 18 for each instant of time during a cycle of operation. The straight portion represents the time during which the lever 18 is latched in its upper position and is being loaded. The curved portion, a cosine curve, represents its swing. The dashed line 155, rising sharply at the start of the cycle, represents the motion of the loading slide 43. The sharply rising portion corresponds to the forward loading stroke occuring while the lever 18 is latched, the next horizontal portion a period of rest to allow the lever to carry the object below the lips 52 of the slide 43, and the succeeding portions the return stroke and period of rest with the motor 57 stopped while waiting for the lever to complete its swing.

The next line 156 shows the portions of the cycle during which the photocell is light. The interruptions when the lever is at the bottom of its swing are dependent upon the weight of the object. This line also shows the time that the relay 116 is energized.

The timing of the cam operated switch 87 is shown by lines 157 and 158. The line 157 shows the portion of the cycle that contacts 123 are closed to energize the relay 125 and the selector solenoids 74 and 75 according to the previous selection. The line 158 shows the remainder of the cycle during which the contacts 127 are closed to energize the relay 121 and the lever latch solenoid 129. These latter elements, the relay 121 and the solenoid 129, may also be energized through contacts 130 of the relay 116 therefore they are energized as long as the photocell is light or the contacts 127 of the switch 87 are closed.

The remaining line 159 shows the operation of the switch 88 to clear the previous selection at the start of each cycle.

It will also be recalled that the motor 57 stops whenever the photocell is light while contacts 123 of the switch 87 are closed.

The sequence of events in a normal cycle of operation is:

First, with the motor 57 running and the lever 18 latched, the slide 43 moves rapidly forward to push the previously weighed object into the selector chutes and load the next object on the load receiver 25.

Second, after a brief pause, the cam 89 operates the switch 87 to close contacts 127 thus energizing the solenoid 129 to release the lever 18. Simultaneously, although not necesessarily precisely so, the cam 90 actuates the switch 88 briefly to clear any previous selection set up on the relays 138, 142 and 148.

Third, after a pause to allow the lever to start to swing, the motor 57 begins to retract the loading slide 43.

Fourth, at the bottom of the swing of the lever 18 the vane 39 acting through the photo electric system sets up the relays 138, 142 and 148 according to the weight of the object.

Fifth, the cam 89 allows the switch 87 to return to its normal position to close contacts 123 thus energizing relay 125, and through the relays 138 or 148, the proper selector solenoid 74 or 75. Since the photocell is light at this time the motor 57 stops.

Sixth, as the lever 18 approaches its latched position the vane 38 interrupts the light, the solenoid 129 is deenergized to latch the lever, and through the relay 121 the motor 57 is started for the next cycle.

The device is adjusted to properly sort the objects by weight by selecting two of the objects whose weights define the upper and lower limits of the correct weight zone. With the "manual-automatic" switch 12 open to prevent operation of the feeding and selecting mechanism, the lighter of the two selected objects is placed in position on the load receiver 25 and the push button 13 is depressed. Current then flows from the supply lead 105 through the contacts of the pushbutton 13, leads 128d, 128a and 128c, the latch solenoid 129 to the return lead 104. The solenoid 129 then unlatches the lever 18. As soon as the lever starts to move and light enters the photo-cell 34 the push button may be released since the lead 128c is then connected through the contacts 130 of the relay 116 to the branch lead 105a of the supply lead 105. The lever 18 is caught on its return in the usual manner.

As the lever approaches the bottom of the swing the vane 39 may or may not interrupt the light to operate the relay 116. The balance weight 24 is adjusted by trial until the relay 116 operates on about half the swings of the lever 18 thus indicating that the vane 39 barely reaches the light beam.

Next with the heavier of the selected weights in position the sensitivity is adjusted. In this case, with the heavier weight, there should be one or two operations of the relay 116 depending upon whether or not the vane 39 passed the light beam. The pendulum weight 22 is adjusted by trial until the approximately equal occurrence of the one or two operations indicates that the vane 39 is barely passing the light beam.

As these adjustments are not completely independent successive adjustment may be necessary to satisfy simultaneously the required conditions of balance and sensitivity.

Modifications may be made to meet various requirements without departing from the essence of the invention as defined in the appended claims.

Having described the invention, we claim:

1. In a device for classifying objects according to weight, in combination, a pendulous lever, a load receiver supported by said lever, a stop for limiting movement of said lever at one end of its travel, a cam on said lever, a latch engaging said cam to push said lever against said stop, means for automatically removing a weighed object from and placing an object to be weighed on said load receiver while in latched position, means for unlatching said lever, means for determining the amplitude of swing of said lever, means for releasing said latch as said lever approaches said stop to permit said latch to engage said cam to position said lever, and means for directing the weighed object into the proper receptacle according to its weight as determined by the swing of said lever.

2. In a device for classifying objects by weight, in combination, a pendulous lever, a load receiver supported by said lever, a stop for limiting movement of said lever at one end of its travel, a cam on said lever, a latch engaging said cam to push said lever against said stop, means for automatically removing weighed objects from and placing objects to be weighed on said load receiver while in latched position, means for withdrawing the latch from the cam of said lever, a light source and photocell in cooperation with vanes on said lever for electrically indicating positions assumed by said lever during its swing, electrical means for positioning a selector in accordance with the swing of said lever, said latch withdrawing means being released by signal from said photocell to permit said latch to catch said lever at completion of its swing.

3. In a device for classifying objects according to weight, in combination, a pendulous lever, a load receiver supported by said lever, a stop for limiting movement of said lever at one end of its travel, a cam on said lever, a latch engaging said cam to push said lever against said stop, a light source and photocell cooperating with vanes on said lever for electrically signalling positions assumed by said lever, electrical means for withdrawing said latch from said cam to release said lever and in response to signals from said photocell for releasing said latch to catch said lever at the completion of its stroke and electrically operated selecting means energized by signals from said photocell in accordance with the amplitude of swing of said lever.

4. In a device of the class described, in combination, a lever adjustable for balance and pendularity, a load receiver supported by said lever, a stop and electrically operated latch for holding said lever at one end of its travel, a formed slide adapted to remove objects from and place objects on said load receiver, a motor driven cam and a spring for operating said slide, electrically operated means for unlatching said lever in timed sequence after the loading of said lever, a light source and photocell cooperating with spaced vanes on said lever for providing electrical indication of positions assumed by said lever, an electrically operated selector positioned in accordance with the amplitude of swing of said lever and means initiated by a signal from said photocell for latching said lever at the completion of its swing.

5. In a device of the class described, in combination, a load receiver suitably supported by a swingable weighing lever, a latch for releasably holding the lever at one end of its travel, a support containing in its upper surface a trough aligned with said load receiver when the lever is latched, a slide over said trough moving in ways along said trough for positioning objects to be weighed along said trough and load receiver, springs for advancing said slide into loading position while said lever is latched, means for withdrawing the latch after the slide reaches loading position and a motor and cam for retracting said slide while said lever is completing a swing, whereby the swing of said lever removes the object to be weighed from the path of said slide before the retraction of said slide.

6. In a device of the class described, in combination, a freely swingable lever adjustable for balance and pendularity, a load receiver supported by said lever, a stop for limiting upward movement of the lever at the top end of its travel, a cam on said lever, an electrically controlled latch for engaging said cam to position said lever against said stop, a frame having a trough in its upper surface in line with the upper position of the load receiver, a reciprocably mounted slide over said trough adapted to intermittently push objects to be weighed along said trough and onto and from said load receiver, means for withdrawing said latch when said slide is at the forward end of its stroke to permit the lever to carry an object below the slide before the retraction of the slide, a light source and photo cell cooperating with vanes on said lever to provide electrical indication of movements of the lever, means responsive to signals from said photo cell to sort the weighed objects and to release said latch withdrawing means as said lever approaches said stop.

FRED W. GILCHRIST.
DONALD B. KENDALL.
ROBERT O. BRADLEY.

REFERENCES CITED

The following references are of record in the file of this patent:

UNITED STATES PATENTS

| Number | Name | Date |
|---|---|---|
| 2,067,744 | Williams | Jan. 12, 1937 |
| 1,784,540 | Ripley | Dec. 9, 1930 |
| 2,051,695 | Glacy | Aug. 18, 1936 |
| 1,120,714 | Hinsdale | Dec. 15, 1914 |